United States Patent [19]

Zwaans

[11] Patent Number: 5,043,966

[45] Date of Patent: Aug. 27, 1991

[54] DEVICE FOR DERIVING A SAMPLING RATE

[75] Inventor: Bernardus A. M. Zwaans, Eindhoven, Netherlands

[73] Assignee: U.S. Philips Corporation, New York, N.Y.

[21] Appl. No.: 338,926

[22] Filed: Apr. 14, 1989

[30] Foreign Application Priority Data

May 25, 1988 [NL] Netherlands ............ 8801340

[51] Int. Cl.$^5$ ............ G11B 5/09; H04N 5/95
[52] U.S. Cl. .................... 369/47; 358/337; 360/64; 360/51; 331/17
[58] Field of Search ............ 358/337, 320, 323, 147, 358/321, 322, 338, 339; 360/64, 36.1, 51, 39, 36.2, 10.3, 36.2, 70, 73; 369/47, 48, 50; 331/1 A, 17, 18, 20, 25

[56] References Cited

U.S. PATENT DOCUMENTS

| | | | |
|---|---|---|---|
| 3,702,382 | 11/1972 | Breikss | 360/24 |
| 3,718,755 | 2/1973 | Crosno | 360/36.1 |
| 3,887,941 | 6/1975 | Dann et al. | 360/36.1 |
| 4,167,027 | 9/1979 | Hashimoto | 358/337 |
| 4,175,267 | 11/1979 | Tachi | 358/147 |
| 4,203,076 | 5/1980 | Yamashita | 360/36.2 |
| 4,692,814 | 9/1987 | Nishimoto | 358/320 |
| 4,729,025 | 3/1988 | Yanase | 358/320 |
| 4,772,950 | 9/1988 | Furuhata et al. | 360/36.1 |
| 4,812,906 | 3/1989 | Wolber | 358/320 |

FOREIGN PATENT DOCUMENTS 239453 10/1986 Japan .................... 360/64

Primary Examiner—Roy N. Envall, Jr.
Assistant Examiner—Thai Tran
Attorney, Agent, or Firm—Edward W. Goodman

[57] ABSTRACT

The device includes a synchronizing-signal separator (20), a phase-locked loop (23), having a phase comparator (25), a voltage-controlled oscillator (28) and a frequency divider (31). The device further includes a gate circuit (26) having an input (S) coupled to the output of the synchronizing-signal separator (20), and an input (5) for receiving a head-change signal (a). The output (36) of the gate circuit (26) is coupled to a control-signal input (37) of the frequency divider (31). The gate circuit (26) is adapted to generate the control signal at a first instant ($t_1$) of a head change and to sustain this control signal until a second instant ($t_2$) of detection of the n-th (preferably the first) synchronizing signal after the head change. The frequency divider (31), which includes a counter (40), is adapted to inhibit the output signal (d) in response to the control signal, to set the count to a specific value, and to enable the counter at the second instant in order to realize frequency-division.

5 Claims, 3 Drawing Sheets

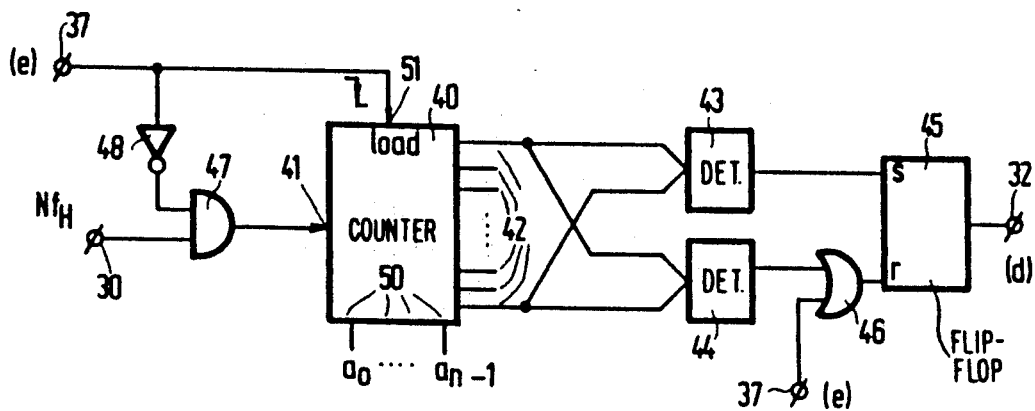
FIG. 4
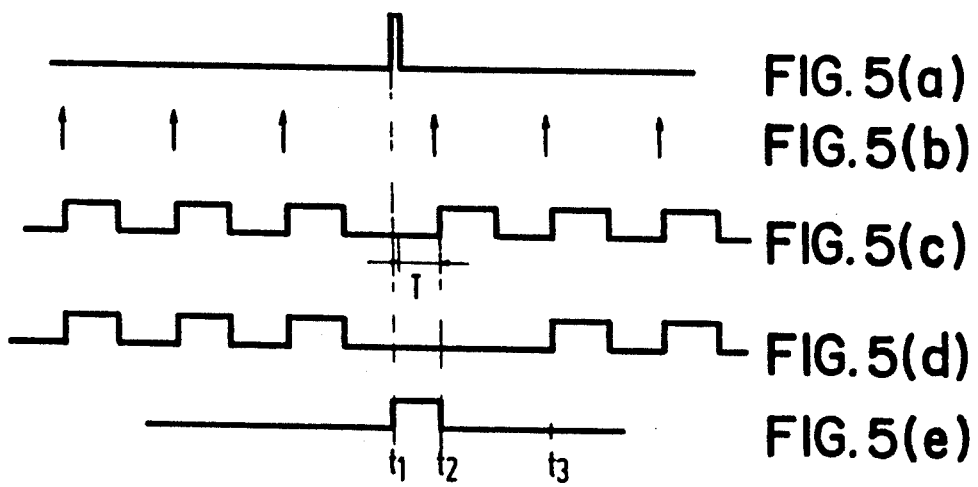
FIG. 5(a)
FIG. 5(b)
FIG. 5(c)
FIG. 5(d)
FIG. 5(e)
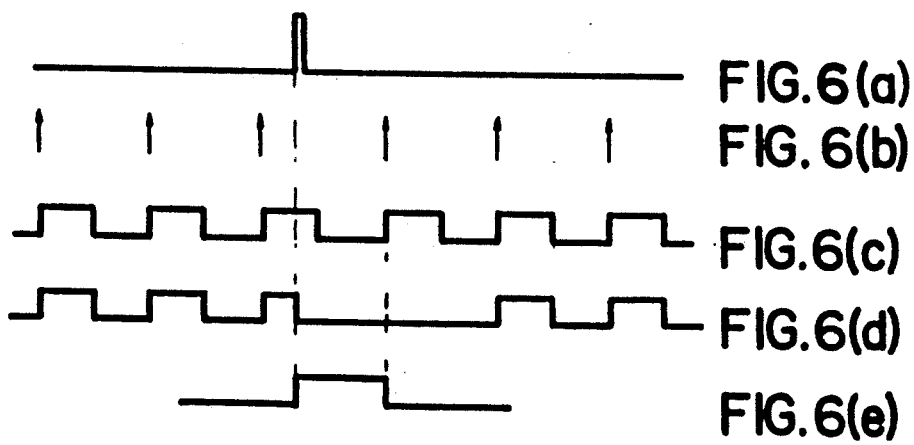
FIG. 6(a)
FIG. 6(b)
FIG. 6(c)
FIG. 6(d)
FIG. 6(e)

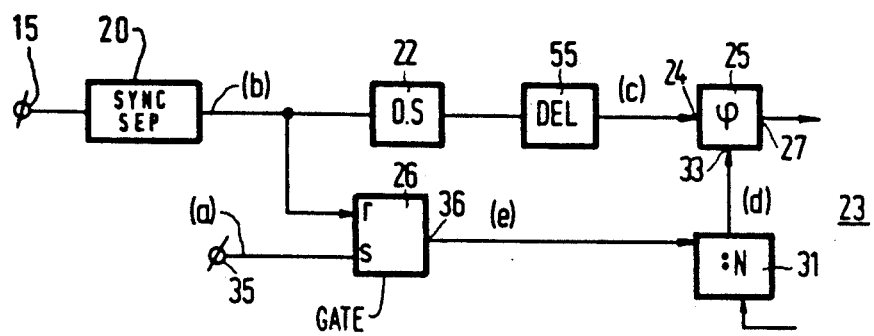
FIG. 7
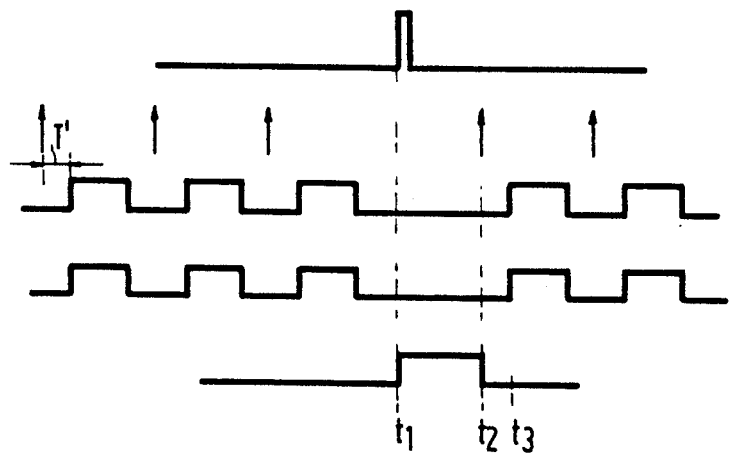
FIG. 8(a)
FIG. 8(b)
FIG. 8(c)
FIG. 8(d)
FIG. 8(e)
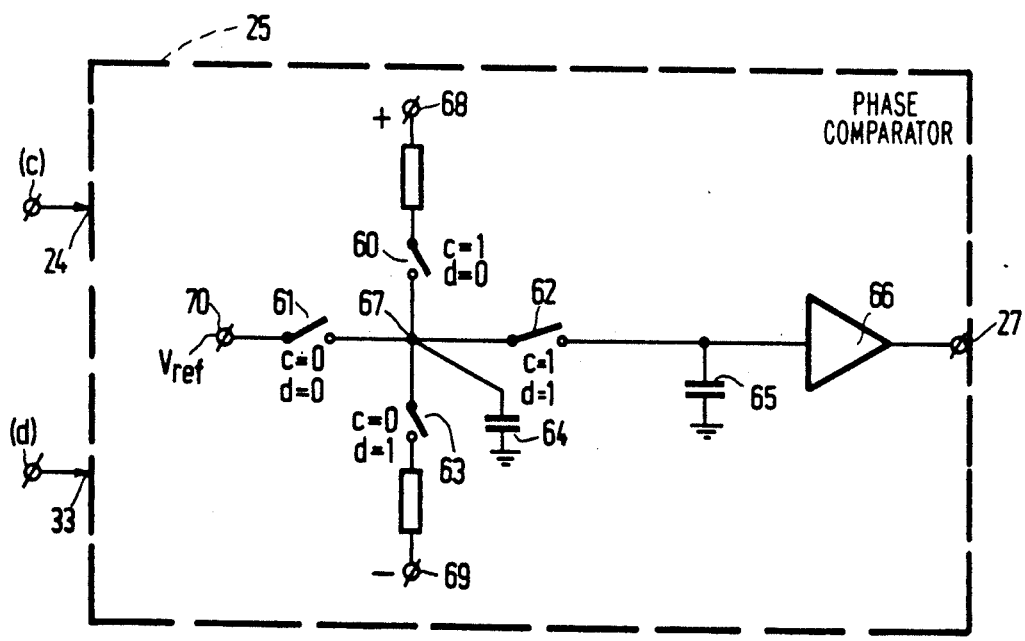
FIG. 9

DEVICE FOR DERIVING A SAMPLING RATE

BACKGROUND OF THE INVENTION

1. Field of the Invention

The invention relates to a time-base correction applied when an electric signal, for example a video signal, is read from a magnetic record carrier by means of a helical scan video recorder.

2. Description of the Related Art

The magazine "Monitor-Proc. IREE" of Apr. 1976, pp. 118-122, describes such a time-base correction. The time-base errors are corrected in such a way that the video signal, which exhibits time-base errors after being read, is digitized with a variable sampling rate and is stored in a memory with the same variable frequency. Subsequently, the video signal stored in the memory is read out with a fixed frequency. The variable sampling rate, and hence the read-in frequency, is generated depending on the instantaneous time-base error. Read-out of the memory results in a video signal which is rid of time-base errors and which can subsequently be reconverted into an analog video signal for display on a TV screen.

The invention aims at providing a device for generating a variable sampling rate frequency and read-in frequency depending upon the time-base errors. The paper entitled "An Analog Segment Recording System for Home Use MUSE VTR" by Owashi et al, read to the "Technical group on video recording of ITEJ" in Tokyo on Aug. 29, 1985 (paper VR 70-4), describes a device for deriving a sampling rate from an electric signal, for example a video signal, which device comprises an input terminal for receiving the electric signal, which input terminal is coupled to an input of a synchronizing signal separator which is constructed to derive a synchronizing signal from the electric signal applied to its input and to supply the synchronizing signal to an output coupled to a first input of a phase comparator of a phase-locked loop, which further comprises a voltage-controlled oscillator having an input coupled to an output of the phase comparator, an output of the oscillator being coupled to an output terminal of the device, to supply the variable sampling rate, and to an input of a frequency divider comprising a counter, an output of the frequency divider being coupled to a second input of the phase comparator. The sampling rate generated by the known device is susceptible to interference.

SUMMARY OF THE INVENTION

It is the object of the invention to provide a device which is less susceptible to interference. To this end the device in accordance with the invention is characterized in that the device further comprises a gate circuit having a first input coupled to the output of the synchronizing-signal separator, a second input for receiving a head-change signal, and an output for supplying a control signal, which output is coupled to a control-signal input of the frequency divider, in that the gate circuit is adapted to generate the control signal at a first instant after a head change and to sustain the control signal until a second instant of detection of the n-th synchronizing signal after the head change, and in that the frequency divider is adapted to set the count of the counter to a specific value in response to the control signal and to enable the counter at the second instant in order to provide frequency-division.

Preferably, the frequency divider is further adapted to inhibit the output signal under the influence of the control signal.

The invention is based on the recognition of the fact that the operation of the known device is disturbed by the head change during the read process in the video recorder. During a head change, a phase jump, and hence a (substantial) time error, will occur in the signal read from the record carrier, which disturbs the operation of the phase-locked loop in the device. The object of the invention is to ensure that the phase-locked loop does not respond to phase disturbances produced in the video signal as a result of the head changes. This is achieved by the step in accordance with the invention, namely by inhibiting the output signal of the frequency divider during a head change and after the detection of the n-th synchronizing signal, preferably the first synchronizing signal after the head change, presetting said divider in such a way that the phase comparator again measures substantially the same phase error as before the head change. The phase-locked loop then directly locks to the (line) synchronizing signal and can again correctly follow the time-base errors in said signal and supply a corresponding sampling rate and read-in frequency, while the phase-locked loop has not responded to disturbances caused by the head change.

A delay unit may be arranged between the output of the synchronizing-signal separator and the input of the phase comparator. Thus, it can be achieved that the phase-locked loop locks in more rapidly after the head change. The time delay produced by the delay unit should then be substantially equal to the delays caused by the gate circuit and the frequency divider. In the absence of the delay unit, these delays prevent the count of the counter in the frequency divider from being set in such a way that the phase comparator measures the correct phase error immediately when the first synchronizing signal is received. This becomes possible by adding the delay unit.

BRIEF DESCRIPTION OF THE DRAWINGS

Some embodiments of the invention will now be described in more detail, by way of example, with reference to the accompanying drawings. In the drawings:

FIG. 4 shows an example of the frequency divider in the device shown in FIG. 3;

FIGS. 5a-5e and 6a-6e show signal waveforms which can appear at various points in the device for two different head-change situations;

FIG. 7 shows the device of FIG. 3 provided with an additional delay unit between the synchronizing-signal separator and the phase comparator;

FIGS. 8a-8e signal waveforms at various points in the device of FIG. 7; and

FIG. 9 shows an example of the phase comparator used in the device.

DESCRIPTION OF THE PREFERRED EMBODIMENT

Figure 1:
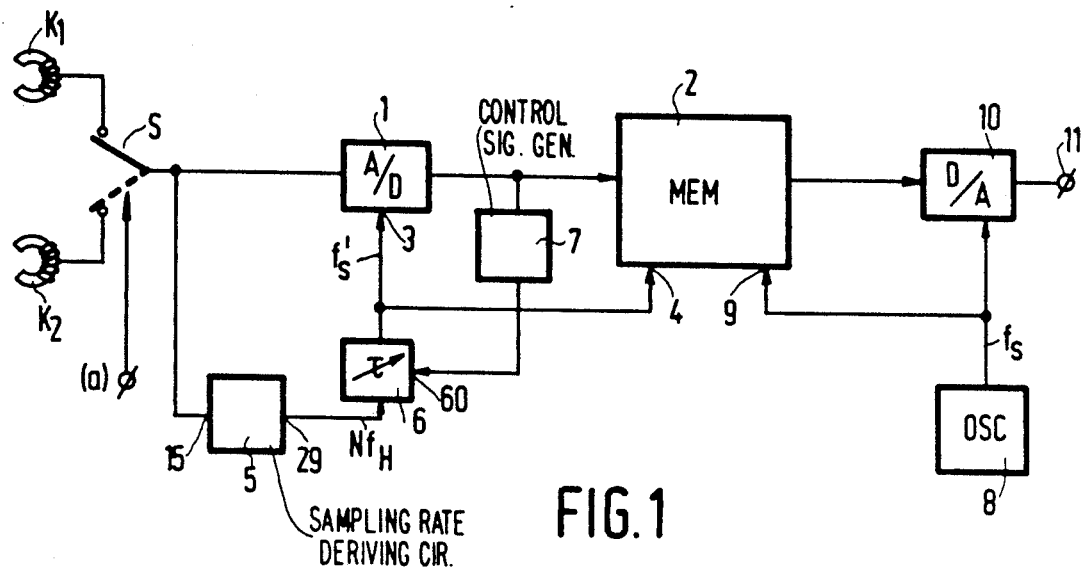
FIG. 1 shows a time-base correction circuit employing the device in accordance with the invention.

FIG. 1 shows diagrammatically a time-base correction circuit. Two heads $K_1$ and $K_2$, which are arranged diametrally opposite one another on a rotatable head drum (not shown), read a video signal from tracks (not shown) which are inclined relative to the longitudinal direction of a magnetic record carrier (not shown). For this purpose the record carrier is wrapped around the head drum with a wrapping angle slightly larger than 180°. The head $K_1$ reads a video signal from a track and applies it to an analog-to-digital converter 1 via the switch S, which is in the upper position. Subsequently, a video signal is read from a subsequent track by the head $K_2$. The switch S is then in the lower position. This video signal is also applied to the A–D converter 1. The video signal read from the record carrier exhibits time errors, for example as a result of inaccuracies in the record-carrier transport or as a result of record-carrier stretch.

The circuit arrangement shown in FIG. 1 serves to provide a correction for these time errors. For this purpose the video signal is sampled and is digitized in the A–D converter 1. The sampling rate is fs'. The samples are read into a memory 2 with a frequency equal to this sampling rate. To this end, said sampling rate is applied to the input 3 of the A–D converter 1 and to the input 4 of the memory 2. The frequency fs' is variable. The variations in the frequency fs' are dictated by the time errors in the video signal. In fact, fs' follows these time errors. For this purpose, the frequency fs' is derived from the video signal which exhibits the time errors and is obtained by means of elements to be described hereinafter and bearing the reference numerals 5, 6 and 7.

Subsequently, the samples read into the memory 2 with a variable frequency fs' are read out with a fixed frequency fs. For this purpose, the circuit comprises an oscillator 8 which generates the fixed frequency fs and applies it to the input 9 of the memory 2. The memory 2 may be constructed as a shift register in the form of a FIFO, the frequency fs' dictating the read-in rate and the frequency fs dictating the read-out rate. The samples read from the memory 2 are applied to a digital-analog converter 10, which converts the digital samples into an analog signal, which is applied to the output terminal 11. The signal on the terminal 11 is exempt from time errors.

In fact, the variable frequency fs' is generated in the device bearing the reference numeral 5.

Figure 2:
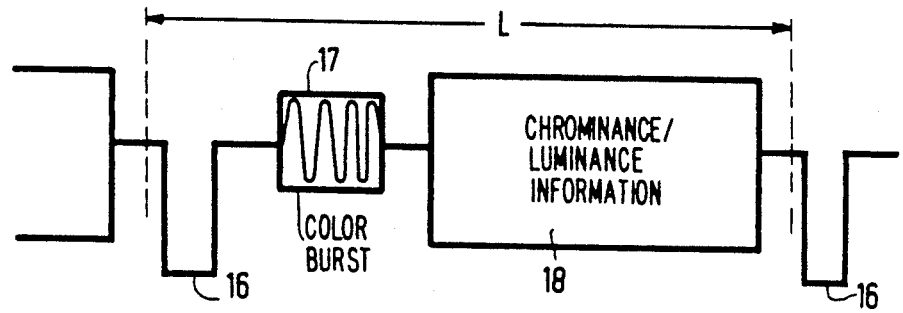
FIG. 2 represents diagrammatically a video signal.
Figure 3:
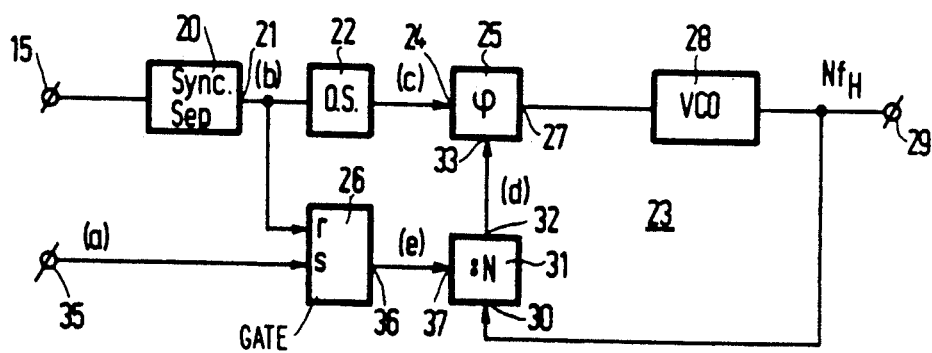
FIG. 3 shows an embodiment of the device in accordance with the invention.

FIG. 3 shows an embodiment of this device. The video signal is applied to the input terminal 15. This video signal comprises consecutive lines L, see FIG. 2, each line containing one line-synchronizing signal (or line pulse) 16, a burst, represented diagrammatically by 17, and the chrominance and luminance information, represented diagrammatically by 18.

The input terminal 15 is coupled to the input of a synchronizing-signal separator 20, which derives the synchronizing signal (the line pulses) 16 from the video signal and supplies it (them) to its output 21. The output 21 is coupled to the input 24 of a phase comparator 25 via a monostable multivibrator (one shot) 22, which comparator is constructed as a sample-and-hold phase comparator and forms part of a phase-locked loop 23. An example of such a phase comparator is shown in FIG. 9 and will be described hereinafter.

The output 21 is also coupled to an input of a gate circuit 26, i.e. the reset input of an S-R (set-reset) flip-flop. The output 27 of the phase comparator 25 is coupled to the output terminal 29 and to an input 30 of a frequency divider 31 via voltage-controlled oscillator 28. The output 32 of the frequency divider 31 is coupled to a second input 33 of the phase comparator 25.

An additional input 35 of the device is coupled to a second input, namely the set input, of the gate circuit 26. The output 36 of the gate circuit is coupled to the control signal input 37 of the frequency divider 31.

The operation of the device shown in FIG. 3 will be explained with reference to FIGS. 1, 5(a)–5(e) and 6(a)–6(e), which show some signal waveforms.

The synchronizing-signal separator 20 extracts the synchronizing signals (line pulses) 16 from the video signal applied to its input and transfers these to its output 21. These line pulses are represented diagrammatically as arrows in FIG. 5(b). The monostable multivibrator 22 transforms these line pulses into a squarewave signal having a duty cycle of, for example 50%, see FIG. 5(c). The frequency of the line pulses and hence that of the squarewave signal is $f_H$. This frequency $f_H$ varies to some extent on account of time-base errors in the video signal.

The phase-locked loop 23 generates a squarewave signal of a frequency $N.f_H$ on the output 29. The frequency divider 31 divides this frequency by N, so that a squarewave having a frequency $f_H$ and a duty cycle of, for example, 50% is obtained again on the output 32, see FIG. 5(d).

The duty cycles of the signals in FIGS. 5(c) and 5(d) need not be equal to each other. However, suitably the sum of the duty cycles of the two signals is 100%. For example, if the signal of FIG. 5(c) has a 25% duty cycle, the signal of FIG. 5(d) preferably has a 75% duty cycle.

The head-change pulses, see FIG. 5(a), are applied to the input 35. The switch S is changed over to another position under the influence of these head-change pulses.

As a result of the head change, at the instant $t_1$ a synchronizing signal delayed by T, see FIG. 5(b), is applied to the phase-locked loop 23. Now the control signal is generated at the instant $t_1$ and the flip-flop 26 is set. The output goes "high", see FIG. 5(e). Under the influence of this "high" control signal, which is applied to the control-signal input 37 of the frequency divider 31, the output signal of the divider 31 is inhibited. This means that if the output signal is "high", it will go "low"—see FIG. 6(d) !—, and if the output signal is "low" it will remain low, see FIG. 5(d).

Under the influence of the next line pulse after the head change at the instant $t_2$ the flip-flop 26 is reset, causing the output signal to go "low", see FIG. 5(e). The output of the frequency divider 31 is now enabled.

From the following description of the frequency divider 31, it will become apparent that it comprises a counter. At a given instant during the apperance of the control signal, for example at the instant $t_1$, this counter will have to be set to a specific count. After the instant $t_2$ at which the control signal has disappeared the counter is free to count. In view of the specific construction of the frequency divider 31, this means that the frequency divider 31 will not generate the squarewave again until the instant at which the second line pulse after the head change appears, i.e. at the instant $t_3$. From this instant the phase-locked loop again locks to the input signal of FIG. 5(c).

FIG. 4 shows an example of the frequency divider 31. The frequency divider comprises a counter 40 which counts up or down under the influence of pulses applied to its input 41. Consequently, n-bit linear numbers will appear on the output 42 which in the case of an upcounter range from 000 ... 00 (the decimal number 0) to 111 ... 11 (the decimal number $2^n-1$), after which the counter recommences with 000 ... 00. Now it is assumed that $N=2^n$. (However, this is not necessarily so). The output 42 of the counter is fed to inputs of two detectors 43 and 44. These two detectors gate out two counts, for example the counts 000 ... 00 (decimal "0") and 100 ... 00 (decimal "N/2"). For the decimal "0" count, for example, the detector 43 supplies a pulse causing the set-reset flip-flop 45 to be set. The signal on the output 32 then goes "high". For the count decimal "N/2" the detector 44 supplies a pulse causing the flip-flop 45 to be reset. The output 32 then goes "low". In this way frequency division by a factor N is achieved.

Now the control signal from the gate circuit 26 is applied to an input of an OR gate 46 arranged between the detector 44 and the flip-flop 45. This means that the flip-flop is reset upon the rising edge of the control signal at the instant $t_1$. If the output 32 is "high" it will go "low". If the output is already "low" it will remain "low".

Moreover, on account of the specific construction of the frequency divider shown in FIG. 4, the supply of the pulses $Nf_h$ to the input 30 should be inhibited at the instant at which the control signal appears. This is achieved by means of the AND gate 47, which via a second input receives the control signal which has been inverted in the inverter 48. Consequently, the counter 40 will no longer count from the instant $t_1$. The control signal is also applied to a load input 55 of the counter. On a falling edge in the control signal, i.e. at the instant $t_2$, the number $a_0 ... a_n$ applied to the input 50 of the counter is loaded into the counter 40, after which the counter can resume counting. Owing to various delays in the circuit the count cannot be set to decimal 0 at this instant $t_2$, but to decimal 1 or 2 or another value. This means that the output signal remains low in the first cycle of the counter and the counter does not for the first time reach the count decimal 0 until the instant at which the second line pulse after the head change occurs, i.e. at the instant $t=t_3$, so that the flip-flop 45 cannot be set until this instant and the output 32 goes "high". Since the counter 40 stops in the time interval between $t=t_1$ and $t=t_2$ to count $a_0 ... a_n$ can also be loaded into the counter 40 at another instant within this time interval.

FIGS. 6(a)-6(e) require no further explanation, because the signals shown in this Figure can be readily derived, utilizing the description of the operation of the device as given hereinbefore. The only difference with FIGS. 5(a)-5(e) is that in FIGS. 6(a)-6(e) the input signal for the phase-locked loop 23 is now high at the instant at which the head change occurs.

FIG. 7 shows a part of the device of FIG. 3. The only difference is that now that an additional delay unit 55 is arranged between the monostable multivibrator 22 and the phase comparator 25, to provide an additional delay of T'.

FIGS. 8(a)-8(e) show the various signal waveforms in the device shown in FIG. 7. It is clearly visible that the input signal, FIG. 8(c), of the phase-locked loop 23 is delayed by a time interval T' relative to the line-synchronizing signal. At the instant $t_2$ at which the first line pulse after the head change appears, the counter 40 in the frequency divider 31 is set to a different value, namely to a high value, say in the proximity of the decimal number $\frac{3}{4}N$ or higher, for example $N-3$ or $N-2$. The counter 40 now begins to count and when the decimal 0 count is detected for the first time, it will again cause the output signal on the output 32 of the frequency divider 31 to go "high". However, now this is effected already at the instant at which the first squarewave after the head change is applied to the phase-locked loop, see FIG. 8(c). It is evident that locking-in will now proceed even more rapidly. It will also be evident that the counter 40 setting is selected in such a way that the first squarewave in the signal shown in FIG. 8(d) is in the same relationship to the signal shown in FIG. 8(e) as before the head change. Thus, by means of the device shown in FIG. 3 or 7, it is possible to obtain a variable frequency $Nf_H$ which tracks the time-base errors in the video signal but which does not respond to disturbances caused by the head change.

The elements 6 and 7 in FIG. 1 constitute an additional control means for deriving the frequency $f_s'$ from the frequency $Nf_H$ supplied by the device 5. The output signal of the device 5 is fed to a variable delay line 6. This delay line 6 enables a delay to be obtained which is variable under the influence of a control signal generated by the control signal generator 7, which control signal is applied to a control signal input 60 of the delay line 6. This additional control may be necessary because the instants at which the rising or falling edges of the line pulses 16 appear, see FIG. 2, cannot always be detected with adequate accuracy as a result of noise in the electric signal. The control signal for the delay line 6 can now be derived from a measurement of the burst 17. The burst comprises, for example, ten periods of a frequency which is in a fixed relationship with the sampling rate employed in the D/A converter during recording. By taking a number of samples of this burst, it is possible to derive a control signal which is a measure of the phase difference between the actual sampling instant and the desired sampling instant. By setting the delay line 6 to correct the delay time, it is possible to compensate for this phase difference, so that the sampling instant actually occurs at the desired instant. This brief description will suffice because this control system falls beyond the scope of the present invention. Moreover, it is to be noted that such a control system is known per se, so that also for this reason no further explanation is required.

FIG. 9 shows an example of the phase comparator 25 of FIG. 3. The phase comparator comprises four switches 60 to 63, a sampling capacitor 64, a hold capacitor 65, and an amplifier stage 66. The signals (c) and (d) are applied to the first input 24 and the second input 33, respectively, see FIG. 3. In fact the signals (c) and (d) are control signals for controlling the switches 60 to 63. The switch 60 is closed if the signal (c) is "high" or logic "1" and the signal (d) is "low" or logic "0". In all the other cases, the switch 60 is open. The switch 61 is closed if the signal (c) is "low" or logic "0" and the signal (d) is logic "0". In all the other cases, the switch 61 is open. The switch 62 is closed if (c) and (d) are both logic "1". In all the other cases, the switch 62 is open. The switch 63 is closed if (c) is logic "0" and (d) is logic "1". In the other cases, the switch 63 is open.

When the switch 60 is closed, point 67 is charged to the positive voltage (+) appearing on point 68. When the switch 63 is closed, this point is charged to the negative voltage (-) appearing on point 69. If the switch 61 is closed, the point 67 is charged to the voltage $V_{ref}$ appearing on point 70. $V_{ref}$ may be, for example, zero volts. If the switch 62 is closed, the hold capacitor 65 is charged to the voltage on point 67 and holds said voltage after the switch 62 has opened again.

It is to be noted that the invention is not limited to the embodiments disclosed herein. The invention also applies to those embodiments which differ from the disclosed embodiments in respects which are not relevant to the invention. For example, the input signal applied to the input terminal 15 need not necessarily be a video signal. It may also be an audio signal with associated synchronizing signals.

What is claim is:

1. A device for deriving a sampling rate from an electric signal having synchronizing signals therein, said device comprising:
   an input terminal for receiving the electric signal;
   a synchronizing signal separator coupled to said input terminal for deriving the synchronizing signals from the electric signal;
   a phase comparator having a first input coupled to an output of said synchronizing signal separator for receiving said synchronizing signals;
   a voltage-controlled oscillator having an input coupled to an output of said phase comparator, an output of said voltage-controlled oscillator being coupled to an output terminal of said device; and
   a frequency divider circuit having an input also coupled to the output of said voltage-controlled oscillator and an output coupled to a second input of said phase comparator, said frequency divider circuit including a counter, an output of said counter being coupled to the output of said frequency divider circuit, a phase-locked loop being formed by said phase comparator, said voltage-controlled oscillator and said frequency divider circuit, characterized in that said device further comprises:
   a gate circuit having a first input coupled to the output of said synchronizing signal separator, a second input for receiving a head-change signal, and an output for supplying a control signal, said gate circuit generating said control signal at a first instant upon receipt of said head-change signal and sustaining said control signal until a second instant corresponding to a detection of the n-th synchronizing signal after said head-change signal; wherein said frequency divider circuit has a control input for receiving said control signal and further includes means for setting a count of said counter to a specific value in response to said control signal, and means for enabling said counter at said second instant to initiate frequency division.

2. A device as claimed in claim 1, characterized in that said frequency divider circuit further comprises means for inhibiting an output signal of said frequency divider circuit at said first instant in response to said control signal.

3. A device as claimed in claims 1 or 2, characterized in that the gate circuit sustains the control signal until the second instant corresponding to detection of the first synchronizing signal after receipt of the head-change signal.

4. A device as claimed in claim 3, characterized in that said device further comprises a delay unit coupled between the output of said synchronizing-signal separator and the first input of said phase comparator.

5. A device as claimed in claims 1 or 2, characterized in that said device further comprises a delay unit coupled between the output of said synchronizing signal separator and the first input of said phase comparator.

* * * * *